(12) United States Patent
Duffett-Smith et al.

(10) Patent No.: US 6,529,165 B1
(45) Date of Patent: Mar. 4, 2003

(54) RADIO POSITIONING SYSTEMS

(75) Inventors: Peter James Duffett-Smith, Cambridge (GB); James Paul Brice, Cambridge (GB); Paul Hansen, Cambridge (GB)

(73) Assignee: Cambridge Positioning Systems, Ltd., Cambridge (GB)

( * ) Notice: Subject to any disclaimer, the term of this patent is extended or adjusted under 35 U.S.C. 154(b) by 0 days.

(21) Appl. No.: 09/830,452

(22) PCT Filed: Jun. 1, 2000

(86) PCT No.: PCT/GB00/02105

§ 371 (c)(1),
(2), (4) Date: Apr. 27, 2001

(87) PCT Pub. No.: WO00/73814

PCT Pub. Date: Jul. 12, 2000

(30) Foreign Application Priority Data

Jun. 1, 1999 (GB) .............................. 9912724

(51) Int. Cl.$^7$ .............................. G01S 3/02; H04Q 7/20
(52) U.S. Cl. ..................... 342/463; 342/464; 455/456
(58) Field of Search ............... 342/463, 464; 455/456

(56) References Cited

U.S. PATENT DOCUMENTS

| | | | |
|---|---|---|---|
| 3,787,862 A | 1/1974 | Jacobson | 342/418 |
| 3,848,254 A | 11/1974 | Drebinger et al. | 342/457 |
| 4,799,062 A | 1/1989 | Sanderford, Jr. et al. | 342/450 |
| 4,975,710 A | 12/1990 | Baghdady | 342/442 |
| 5,017,926 A | 5/1991 | Ames et al. | 342/353 |
| 5,045,861 A * | 9/1991 | Duffett-Smith | 342/463 |
| 5,128,925 A | 7/1992 | Dornstetter et al. | 370/17 |
| 5,208,756 A | 5/1993 | Song | 364/449 |
| 5,293,642 A | 3/1994 | Lo | 455/33.1 |
| 5,293,645 A | 3/1994 | Sood | 455/54.1 |
| 5,317,323 A | 5/1994 | Kennedy et al. | 342/457 |
| 5,327,144 A | 7/1994 | Stilp et al. | 342/387 |
| 5,359,332 A | 10/1994 | Allison et al. | 342/357 |
| 5,365,450 A | 11/1994 | Schuchman et al. | 364/449 |

(List continued on next page.)

FOREIGN PATENT DOCUMENTS

| | | |
|---|---|---|
| DE | 19621225 | 12/1996 |
| EP | 0038151 | 10/1981 |
| EP | 0303371 | 2/1989 |
| EP | 0437822 A3 * | 7/1991 |
| EP | 0672917 | 9/1995 |
| EP | 0767594 | 9/1996 |
| GB | 2254508 | 10/1992 |

(List continued on next page.)

*Primary Examiner*—Thomas H. Tarcza
*Assistant Examiner*—Fred Mull
(74) *Attorney, Agent, or Firm*—Roylance, Abrams, Berdo & Goodman, L.L.P.

(57) ABSTRACT

The invention concerns a method of determining the position or change in position or state of motion of a receiver or receivers, the position or change in position or state of motion of which is or are not already known, in a network of transmission sources some or all of whose positions are known. At a first time, the relative offsets in time, phase, frequency, or derivatives thereof with respect to each other, or with respect to a reference source, of the signals received by a first receiver from a plurality of the transmission sources are measured. At a selected second time, the respective offsets of the signals received by the same or a second receiver, whose position or state of motion is not already known, from the plurality of the transmission sources are measured. Then the position of the receiver or receivers at the first or second times or the change in position of the first receiver between the first and second times or the state of motion of either receiver is calculated from the relationship between the first and second sets of relative offsets.

12 Claims, 4 Drawing Sheets

U.S. PATENT DOCUMENTS

| | | | |
|---|---|---|---|
| 5,365,516 A | 11/1994 | Jandrell | 370/18 |
| 5,422,813 A | 6/1995 | Schuchman et al. | 364/449 |
| 5,465,289 A | 11/1995 | Kennedy, Jr. | 379/59 |
| 5,512,909 A | 4/1996 | Kronhamn | 342/417 |
| 5,519,618 A | 5/1996 | Kastner et al. | 364/439 |
| 5,519,760 A | 5/1996 | Borkowski et al. | 379/59 |
| 5,526,357 A | 6/1996 | Jandrell | 370/95.2 |
| 5,534,876 A | 7/1996 | Erickson et al. | 342/387 |
| 5,559,864 A | 9/1996 | Kennedy, Jr. | 379/59 |
| 5,568,153 A | 10/1996 | Beliveau | 342/357 |
| 5,570,094 A | 10/1996 | Armstrong | 342/107 |
| 5,592,180 A | 1/1997 | Yokev et al. | 342/450 |
| 5,592,181 A | 1/1997 | Cai et al. | 342/457 |
| 5,596,330 A | 1/1997 | Yokev et al. | 342/387 |
| 5,600,706 A | 2/1997 | Dunn et al. | 379/59 |
| 5,604,765 A | 2/1997 | Bruno et al. | 375/200 |
| 5,612,729 A | 3/1997 | Ellis et al. | 348/2 |
| 5,629,710 A | 5/1997 | Sawada | 342/457 |
| 5,680,142 A | 10/1997 | Smith et al. | 342/372 |
| 5,689,270 A * | 11/1997 | Kelley et al. | 342/463 |
| 5,701,328 A | 12/1997 | Schuchman et al. | 375/204 |
| 5,729,694 A | 3/1998 | Holzrichter et al. | 395/2.17 |
| 5,838,279 A | 11/1998 | Duffet-Smith et al. | 342/459 |
| 5,859,612 A | 1/1999 | Gilhousen | 342/457 |
| 5,917,449 A | 6/1999 | Sanderford et al. | 342/457 |
| 5,960,355 A * | 9/1999 | Ekman et al. | 455/456 |
| 6,094,168 A * | 7/2000 | Duffett-Smith et al. | 342/463 |
| 6,275,705 B1 * | 8/2001 | Drane et al. | 455/456 |

FOREIGN PATENT DOCUMENTS

| | | |
|---|---|---|
| GB | 2260050 | 3/1993 |
| GB | 2264837 | 9/1993 |
| GB | 2284054 | 12/1997 |
| JP | 0718124 | 7/1995 |
| WO | 9304453 | 3/1993 |
| WO | 9523981 | 9/1995 |
| WO | 9614588 | 5/1996 |
| WO | 9621162 | 7/1996 |
| WO | 9621332 | 7/1996 |
| WO | 9625830 | 8/1996 |
| WO | 9711384 | 3/1997 |
| WO | 9744681 | 5/1997 |
| WO | 9744682 | 5/1997 |
| WO | 9723875 | 7/1997 |
| WO | 9728455 | 8/1997 |
| WO | 9728456 | 8/1997 |
| WO | 9730360 | 8/1997 |
| WO | 9813947 | 9/1997 |
| WO | 9818018 | 4/1998 |
| WO | 9819488 | 5/1998 |
| WO | 9852376 | 11/1998 |
| WO | WO 99/21028 * | 4/1999 |
| WO | 9921028 | 4/1999 |
| WO | 9953708 | 10/1999 |
| WO | 0073813 | 12/2000 |
| WO | 0073814 | 12/2000 |

* cited by examiner

RADIO POSITIONING SYSTEMS

BACKGROUND OF THE INVENTION

1. Field of the Invention

The present invention relates generally to improvements in radio positioning systems and their methods of operation and in particular to use in non-synchronised transmitter networks without the need for additional monitoring receivers.

2. Description of the Related Art

U.S. Pat. No. 5,045,861, the contents of which are hereby incorporated by reference, describes a radio navigation and tracking system which makes use of independent radio transmitters set up for other purposes. The signals from each transmitter, taken individually, are received by two receiving stations, one at a fixed and known location, and the other mounted on the mobile object whose position is to be determined. A representation of the signals received at one receiving station is sent via a link to a processor at the other receiving station, where the received signals are compared to find their phase differences or time delays. Three such measurements, made on three widely spaced independent transmitters, are sufficient to determine the position of the mobile receiver in two dimensions, i.e. its position on the ground. The phase or time offset between the master oscillators in the two receivers is also determined.

"CURSOR", as the system described in U.S. Pat. No. 5,045,861 is known, is a radio positioning system which can use the signals radiated by existing non-synchronised radio transmitters to locate the position of a portable receiver. Unlike some other systems which use the temporal coherence properties of networks of purpose-built synchronised transmitters, CURSOR makes use of the spatial coherence of the signals transmitted by single transmitters. In a further development (see U.S. Pat. No. 6,094,168 & U.S. Ser. No. 09/529,914), the technology has been applied to find the position of a mobile phone handset in a GSM or other digital telephone system, and these are examples of an 'Enhanced Observed Time Difference' (E-OTD) method using the down-link signals radiated by the network of Base Transceiver Stations (BTS) of the telephone system.

In the digital mobile telephone application described in U.S. Pat. No. 6,094,168, the contents of which are hereby incorporated by reference, the signals from each BTS within range of the handset are received both by the handset itself and by a fixed nearby receiver, the Location Measurement Unit (LMU), whose position is accurately known. Representations of the received signals are passed to a Mobile Location Centre (MLC) where they are compared in order to find the time difference between them. In FIG. 1 we show the geometry of a standard two-dimensional system. The origin of Cartesian co-ordinates x and y is centred on the LMU positioned at O. The orientation of the axes is immaterial, but may conveniently be set so that the y axis lies along the north-south local map grid. The handset, R, is at vector position r with respect to the LMU position O. A BTS, A, is shown at vector position a.

Consider first the signals from BTS A. The time difference, $\Delta t_a$, measured between the signals received at R and O is given by $$\Delta t_a = (|r-a|-|a|)/v + \epsilon,$$

where $v$ is the speed of the radio waves, $\epsilon$ is the clock time offset between the clocks in the receivers at R and O, and the vertical bars each side of a vector quantity denote that it is the magnitude of the vector which is used in the equation. The value of $\epsilon$ represents the synchronisation error between the measurements made by the two receivers. Similarly, may written for two other BTSs (B and C) at vector positions b and c (not shown):

$$\Delta t_b = (|r-b|-|b|)/v + \epsilon,$$

$$\Delta t_c = (|r-c|-|c|)/v + \epsilon, \quad (1)$$

The values of $\Delta t_a$, $\Delta t_b$, $\Delta t_c$, are measured by the methods disclosed in U.S. Pat. No. 6,094,168 and the values of a, b, c, and $v$ are known. Hence the equations (1) can be solved to find the position of the handset, r, together with the value of $\epsilon$.

In U.S. Ser. No. 09/529,914, the contents of which are hereby incorporated by reference, it is described how time offsets between received signals and the receiver's local clock can be measured using locally-created templates in a GSM telephone system as follows. Suppose that the handset has recorded a short burst of the GSM signals from BTS A. Contained within that recording is the framing structure, synchronisation bursts and other 'given' data (or predetermined values) which are a constant feature of those transmissions. The processor within the handset can create a matching template, based on the known structure of the network signals. Received signals can then be matched by the locally-generated template. When the template finds a match, the correlation peak at the position of best match corresponds to the time offset between the received signals and the local clock inside the handset. For the signals radiated by BTS A this measured time offset, $\Delta t_{a1}$, is given by $$\Delta t_{a1} = (|r-a|)/v + \alpha_a + \epsilon_1,$$

where $\alpha_a$ is the time offset of the BTS transmissions and $\epsilon_1$ is the time offset of the handset's internal clock, both relative to an imaginary universal 'absolute' clock. The signals from BTSs B and C may also be measured in the same way, giving $$\Delta t_{b1} = (|r-b|)/v + \alpha_b + \epsilon_1,$$

and $$\Delta t_{c1} = (|r-c|)/v + \alpha_c + \epsilon_1, \quad (2)$$

The same measurements can also be made by the LMU, giving $$\Delta t_{a2} = (|a|)/v + \alpha_a + \epsilon_2,$$

$$\Delta t_{b2} = (|b|)/v + \alpha_b + \epsilon_2,$$

and $$\Delta t_{c2} = (|c|)/v + \alpha_c + \epsilon_2, \quad (3)$$

where $\epsilon_2$ is the time offset of the LMU's internal clock relative to the same imaginary universal absolute clock. Subtracting equations 3 from equations 2 gives $$\Delta t_a = \Delta t_{a1} - \Delta t_{a2} = (|r-a|-|a|)/v + \epsilon,$$

$$\Delta t_b = \Delta t_{b1} - \Delta t_{b2} = (|r-b|-|b|)/v + \epsilon,$$

and $$\Delta t_c = \Delta t_{c1} - \Delta t_{c2} = (|r-c|-|c|)/v + \epsilon, \quad (4)$$

where $\epsilon = \epsilon_1 - \epsilon_2$. It will be noted that equations 4 are just like equations 1, and can be solved in the same way to find the position of the handset, r, and the value of $\epsilon$.

The methods described above measure time offsets. However, it is sometimes useful to measure phase offsets, frequency offsets, or derivatives of frequency offsets as described later.

It will be apparent that the CURSOR method, in common with all other methods which use the signals from non-synchronised transmitters, requires a network of LMUs to be set up within the coverage area of the telephone system. These units act as reference points at which the unsynchronised signals radiated by the BTSs are measured for comparison with the same signals received by a handset. In another patent application (U.S. Ser. No. 09/830,447) filed simultaneously herewith, we show how the entire network of BTS can be covered using just one "virtual LMU" which acts as the service node for all LMU data. The present invention shows how the CURSOR method (or other E-OTD method) can be applied without the need of a network of real LMUs.

SUMMARY OF THE INVENTION

According to the first aspect of the invention there is provided a method of determining the position or change in position or state of motion of a receiver or receivers, the position or change in position or state of motion of which is or are not already known, in a network of transmission sources some or all of whose positions are known, the method comprising (a) at a first time, measuring the relative offsets in time, phase, frequency, or derivatives thereof with respect to each other, or with respect to a reference source, of the signals received by a first receiver from a plurality of the transmission sources;

(b) at a selected second time, measuring the respective offsets of the signals received by the same or a second receiver whose position or state of motion is not already known from the plurality of the transmission sources; and (c) calculating the position of the receiver or receivers at the first or second times or the change in position of the first receiver between the first and second times or the state of motion of either receiver from the relationship between the first and second sets of relative offsets.

By "state of motion" is meant a function of the movement of the receiver, including its velocity, acceleration, rate of change of acceleration etc.

The relative offsets in time, phase, frequency, or derivatives thereof, with respect to each other or with respect to a reference source, of the signals received by the first or second receivers from a plurality of the transmission sources may be represented by corresponding offsets or differences in the distances between the transmission sources and the first or second receivers.

It should be understood that, if the second time is measured at a second receiver, the first and second times could be the same.

At selected additional times, the respective relative offsets in time, phase, frequency, or derivatives thereof with respect to each other or with respect to a reference source of the signals received by the first receiver, or by the second receiver, or another receiver or receivers whose positions, changes in position, or states of motion is or are not already known, from a plurality of the transmission sources may be measured; and the position, change in position, or state of motion thereof of any or all of the receivers may be determined using the measurements and known positions of the transmission sources.

In the above aspect, it should be understood that any of the selected times could be the same as any other of the selected times.

The invention also includes a system for carrying out this method, which system may include receivers controlled by computers or microprocessors suitably programmed.

BRIEF DESCRIPTION OF THE DRAWINGS

Examples of the method and system according to the present invention will now be described with reference to the accompanying drawings, in which.

DETAILED DESCRIPTION OF THE PREFERRED EMBODIMENTS

Figure 1:
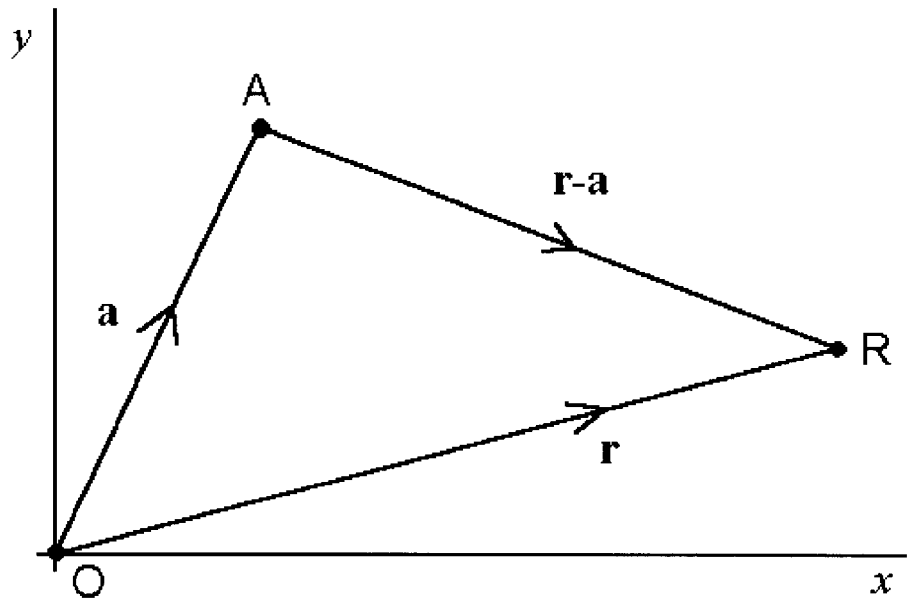
FIG. 1 shows the geometry of a standard two-dimensional system.

To illustrate one example, in which the transmitters and receivers are part of a digital mobile telephone network, suppose that the handset is at vector position $r(t_1)$ at time $t_1$. Equations (2) are then $$\Delta t_{a1}(t_1) = (|r(t_1)-a|)/v + \alpha_a(t_1) + \epsilon_1(t_1),$$

$$\Delta t_{b1}(t_1) = (|r(t_1)-b|)/v + \alpha_b(t_1) + \epsilon_1(t_1),$$

$$\Delta t_{c1}(t_1) = (|r(t_1)-c|)/v + \alpha_c(t_1) + \epsilon_1(t_1), \quad (5)$$

where $\alpha_a(t_1)$ is the time offset of the BTS transmissions from A, $\alpha_b(t_1)$ the offset from B, $\alpha_c(t_1)$ the offset from C, and $\epsilon_1(t_1)$ is the time offset of the handset's internal clock, all measured at time $t_1$ relative to an imaginary universal 'absolute' clock. Now, if the handset is at a different vector position $r(t_2)$ at a later time $t_2$, equations (2) are then $$\Delta t_{a1}(t_2) = (|r(t_2)-a|)/v + \alpha_a(t_2) + \epsilon_1(t_2),$$

$$\Delta t_{b1}(t_2) = (|r(t_2)-b|)/v + \alpha_b(t_2) + \epsilon_1(t_2),$$

$$\Delta t_{c1}(t_2) = (|r(t_2)-c|)/v + \alpha_c(t_2) + \epsilon_1(t_2). \quad (6)$$

Subtracting equations (6) from equations (5) gives $$\Delta t_{a1}(t_1) - \Delta t_{a1}(t_2) = (|r(t_1)-a| - |r(t_2)-a|)/v + (\alpha_a(t_1) - \alpha_a(t_2)) + (\epsilon_1(t_1) - \epsilon_1(t_2)),$$

$$\Delta t_{b1}(t_1) - \Delta t_{b1}(t_2) = (|r(t_1)-b| - |r(t_2)-b|)/v + (\alpha_b(t_1) - \alpha_b(t_2)) + (\epsilon_1(t_1) - \epsilon_1(t_2)),$$

$$\Delta t_{c1}(t_1) - \Delta t_{c1}(t_2) = (|r(t_1)-c| - |r(t_2)-c|)/v + (\alpha_c(t_1) - \alpha_c(t_2)) + (\epsilon_1(t_1) - \epsilon_1(t_2)). \quad (7)$$

As has been noted above, the BTS transmissions in a GSM or other digital network are not usually synchronised. However, the BTSs are usually equipped with high-stability oscillators and the signals are often locked to a common reference timing source.

Where this is the case, the signals keep a constant time offset with respect to each other, so $\alpha_a(t_1) = \alpha_a(t_2)$, $\alpha_b(t_1) =$ $\alpha_b(t_2)$, and $\alpha_c(t_1)=\alpha_c(t_2)$. (Even where this is not the case, the BTS signals are often sufficiently stable to allow an estimate to be made of these differences in a service node or other network element.) Writing $\Delta t_a=\Delta t_{a1}(t_1)-\Delta t_{a1}(t_2)$, $\Delta t_b=\Delta t_{b1}(t_1)-\Delta t_{b1}(t_2)$, $\Delta t_c=\Delta t_{c1}(t_1)-\Delta t_{c1}(t_2)$, and $\epsilon=\epsilon_1(t_1)-\epsilon_1(t_2)$, gives $$\Delta t_a=(|r(t_1)-a|-|r(t_2)-a|)/v+\epsilon,$$

$$\Delta t_b=(|r(t_1)-b|-|r(t_2)-b|)/v+\epsilon,$$

$$\Delta t_c=(|r(t_1)-c|-|r(t_2)-c|)/v+\epsilon. \quad (8)$$

Figure 2:
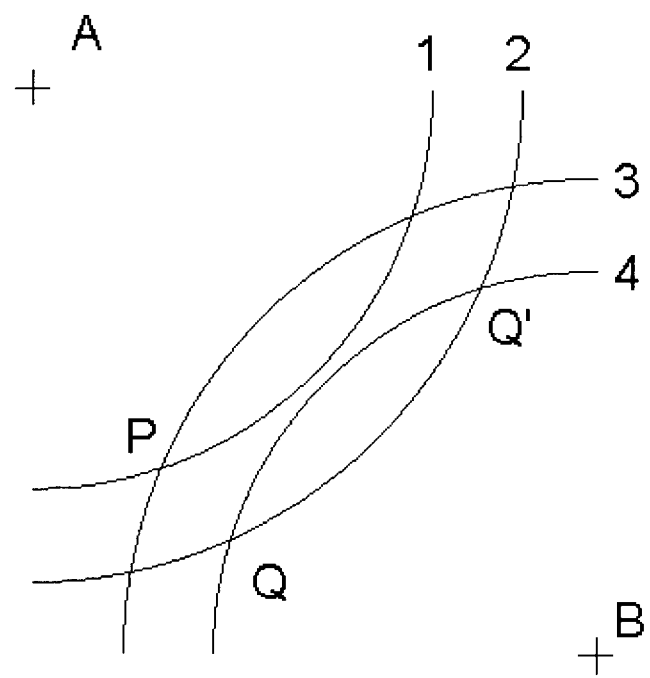
FIG. 2 is a diagram representing the plane of the Earth's surface (assumed to be flat) near to a pair of BTS units.

Equations (8) can be understood graphically by reference to FIG. 2. The diagram represents the plane of the Earth's surface (assumed to be flat) near to BTS units A and B. In the first of the equations, the term $|r(t_1)-a|$ represents the distance of the handset from A at time $t_1$, and the term $|r(t_2)-a|$ represents its distance at time $t_2$. The first of equations (8) can be rewritten as $$|r(t_1)-a|-|r(t_2)-a|=v\Delta t_a-v\epsilon,$$

which therefore represents the loci of two concentric circles centred on A whose radii differ by $v\Delta t_a-v\epsilon$. These are marked 1 and 2 respectively in FIG. 2. The above equation does not define the radius of either circle, but only the difference between them. By itself, this equation therefore does nothing to locate either of the points $r(t_1)$ or $r(t_2)$. Also marked in FIG. 2 are a second pair of concentric circles, 3 and 4, representing the second of the equations (8) and centred on B. Again, their radii are undefined by the equation, but the difference between their radii must be $v\Delta t_b-v\epsilon$. Point $r(t_1)$ must lie at one of the intersections of circles 1 and 3, and point $r(t_2)$ must lie at one of the intersections of circles 2 and 4. Suppose that the value of $\epsilon$ is zero, i.e. that the handset's internal clock has kept perfect time between the measurements; then if we know the position of point $r(t_1)$, say P in FIG. 2, we can deduce that point $r(t_2)$ must be at Q, because the four circles are now fixed in space, and hence we have measured the position of the handset at the later time. In practice, we can't assume that $\epsilon$ is zero, so we must use all three of equations (8) to find Q given P.

It will be noted there is also a second point of intersection, Q', of the circles 2 and 4, and hence an ambiguity in the determination of $r(t_2)$. If this ambiguity cannot be resolved by other means (for example, by knowing that the handset is being used by a pedestrian who could not have moved from P to Q' in time $t_2-t_1$) then four measurements involving four BTSs may be used.

One of the advantages of the present invention is that if a single handset makes measurements of the signals from a minimum of three geographically separate BTSs at two different times, then it is possible to determine the change in the position of the handset between these two times (without reference to a known starting point), provided that at least three of the BTSs are common to the two sets of measurements. If the position of the handset has been determined at some point previously, use of this technique can enable applications requiring autonomous navigation within the handset, i.e. navigation without further reference to the CURSOR or any other E-OTD system.

An extension of the invention, described later, shows how the times $t_1$ and $t_2$ can be brought arbitrarily close together so that the measurements produce estimates of rates of change, or derivatives, of the measured quantities.

The above discussion shows how the position of a handset at a later time can be obtained from three CURSOR-like measurements on three geographically-dispersed BTSs made both at the later time and at an earlier time provided (a) that the position of the handset is known at the earlier time, and (b) that there is no relative drift between the signals radiated by the BTSs in the interval (or that such drift is known). The accuracy of the position determination depends both on the precision with which the first position is known and on the distance moved between the measurements. Equations (8) actually contain five unknown quantities: the x and y co-ordinates of each of the two points P and Q, and the unknown handset clock drift $\epsilon$. CURSOR-like measurements on each of five geographically-dispersed BTSs at both a first and a second position are therefore sufficient to determine both P and Q uniquely if the handset has moved appreciably between the two sets of measurements.

Thus, the invention provides an E-OTD method of finding the position of a moving handset in an unsynchronised digital mobile phone network without the need of any LMUs at all. It may be especially useful for tracking the handset in a network which does not already have a location system.

Figure 4:
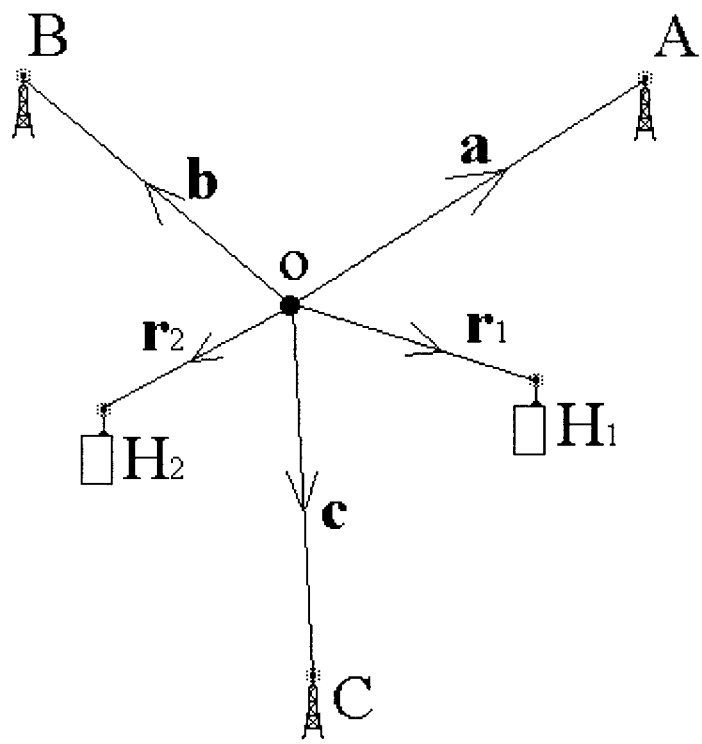
FIG. 4 shows a digital mobile telephone network with two handsets and three BTSs incorporating a system according to the invention.

A further advantage of the present invention is the ability to use the known position of one handset to find the unknown position of a second handset. Suppose that each handset makes a measurement at about the same time using three geographically-dispersed BTSs A, B, C (see FIG. 4). Equations 5 for the first handset, $H_1$, are then $$\Delta t_{a1}(t_1)=(|r_1(t_1)-a|)/v+\alpha_a(t_1)+\epsilon_1(t_1),$$

$$\Delta t_{b1}(t_1)=(|r_1(t_1)-b|)/v+\alpha_b(t_1)+\epsilon_1(t_1),$$

$$\Delta t_{c1}(t_1)=(|r_1(t_1)-b|)/v+\alpha_c(t_1)+\epsilon_1(t_1), \quad (9)$$

where $r_1(t_1)$ is the (known) position of $H_1$ and the measurements are made at time $t_1$. The same equations for the second handset, $H_2$, are $$\Delta t_{a1}(t_2)=(|r_2(t_2)-a|)/v+\alpha_a(t_2)+\epsilon_2(t_2),$$

$$\Delta t_{b1}(t_2)=(|r_2(t_2)-b|)/v+\alpha_b(t_2)+\epsilon_2(t_2),$$

$$\Delta t_{c1}(t_2)=(|r_2(t_2)-c|)/v+\alpha_c(t_2)+\epsilon_2(t_2),$$

where $r_2(t_2)$ is the (unknown) position of $H_2$ and the measurements are made at time $t_2$. Subtracting equations (10) from equations (9), noting that $\alpha_a(t_1)=\alpha_a(t_2)$, $\alpha_b(t_1)=\alpha_b(t_2)$, and $\alpha_c(t_1)=\alpha_c(t_2)$, and writing $\Delta t_a=\Delta t_{a1}(t_1)-\Delta t_{a1}(t_2)$, $\Delta t_b=\Delta t_{b1}(t_1)-\Delta t_{b1}(t_2)$, $\Delta t_c=\Delta t_{c1}(t_1)-\Delta t_{c1}(t_2)$, and $\epsilon=\epsilon_1(t_1)-\epsilon_2(t_2)$, we get $$\Delta t_a=(|r_1(t_1)-a|-|r_2(t_2)-a|)/v+\epsilon,$$

$$\Delta t_b=(|r_1(t_1)-b|-|r_2(t_2)-b|)/v+\epsilon,$$

$$\Delta t_c=(|r_1(t_1)-c|-|r_2(t_2)-c|)/v+\epsilon, \quad (11)$$

which are identical in form to equations (8). Hence, given $r_1(t_1)$, the position of $H_1$ at time $t_1$, we can calculate $r_2(t_2)$ which is the position of $H_2$ at time $t_2$. (Again, measurements on four BTSs are needed to resolve the ambiguity in $r_2(t_2)$ if this cannot be resolved by other means.) In this case, $t_1$ may be equal to $t_2$.

This same idea can be extended to many handsets. In equations (11), the vector $r_1(t_1)$ refers to a first handset $H_1$ whose position is known, and the vector $r_2(t_2)$ refers to any second handset $H_2$–$H_n$, perhaps representing any one of a large number. It is therefore possible to use, as a temporary measure, a first handset $H_1$ at a known location as the "LMU", offering the possibility of establishing an E-OTD service very quickly in a new area.

This method can be used even in an area already covered by an LMU. Having used a normal E-OTD method to find the position of a handset $H_1$, the handset can then be tracked without further reference to the LMU. The calculation of the handset's position could be made at a service node (e.g. the mobile location centre; MLC), at another location, or in the handset itself, depending on the application.

Another interesting application is to a system of many handsets $H_1$–$H_n$ in an area in which none of their positions is known. Provided that any pair sufficiently far apart can measure the same five BTSs A–E (see, by way of example, FIG. 5), their positions can be determined using five equations like the three in (8). Otherwise, provided that separated pairs can measure at least three or four common BTSs, calculations based on many such measurements by pairs over a short period may be sufficient to determine the positions of all of them.

Figure 5:
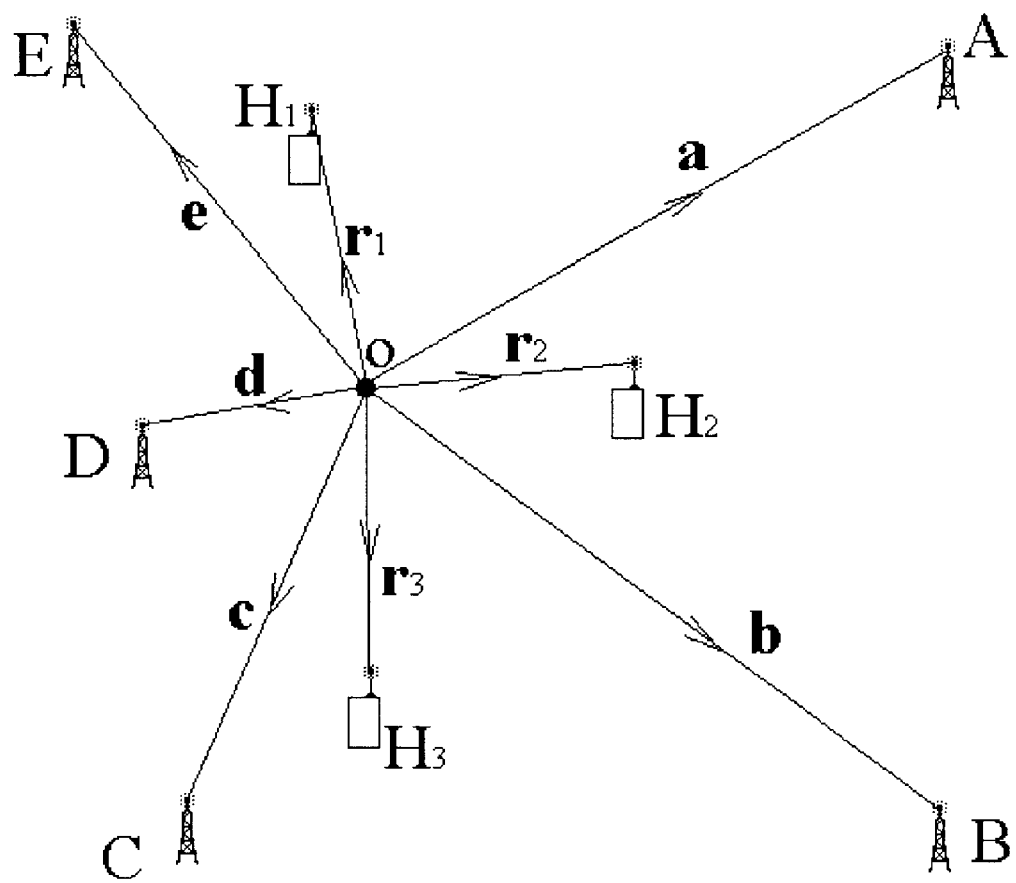
FIG. 5 shows a digital mobile phone network with three handsets and five BTSs incorporating a system according to the invention.

Consider, for example, a set of three handsets, $H_1$, $H_2$, and $H_3$ (see FIG. 5). The relative positions of $H_1$ and $H_2$, $H_2$ and $H_3$, and $H_3$ and $H_1$, may be computed using three or four BTS measurements since the constraints imposed by the equations on the positions of the vertices of the triangle $H_1H_2H_3$ may make the solution unique. In any case, well-known statistical techniques exist, such as those based on Bayes' theorem or a maximum likelihood method, which can be used to solve the equations.

In the above discussions, we have made the assumption that the BTS network stability is good enough to be able to predict relative drifts between measurements. It is possible to apply the invention to a network in which the BTSs signals are free-running with respect to each other, i.e. one in which there is no synchronisation of any sort between the transmissions. In this case, at least two handsets are required which can receive the signals from the same five geometrically-dispersed BTSs at substantially the same time as each other. Equations (11) then become $$\Delta t_a = (|r_1(t_1)-a|-|r_2(t_1)-a|)/v+\epsilon,$$
$$\Delta t_b = (|r_1(t_1)-b|-|r_2(t_1)-b|)/v+\epsilon,$$
$$\Delta t_c = (|r_1(t_1)-c|-|r_2(t_1)-c|)/v+\epsilon,$$
$$\Delta t_d = (|r_1(t_1)-d|-|r_2(t_1)-d|)/v+\epsilon,$$
$$\Delta t_e = (|r_1(t_1)-e|-|r_2(t_1)-e|)/v+\epsilon, \quad (12)$$

where a, b, c, d, and e are the vector positions of the five BTSs, $r_1(t_1)$ is the vector position of the first handset $H_1$ and $r_2(t_1)$ is the position of the second handset $H_n$, both sets of measurements being made at the same time $t_1$. This moment could be signalled, for example, by a particular element of the transmissions such as a particular frame number or a special signal. In equations (12), the transmission time offsets of the signals from the BTSs (the quantities $\alpha_a$, $\alpha_b$, $\alpha_c$ etc.) cancel out and do not appear provided that the measurements are made by the two handsets sufficiently close together in time that the drifts are small enough to ignore. The five measurements in equations (12) are sufficient to locate the two handsets. Note that no LMU or equivalent is required in this case.

It is described in another copending PCT patent application (U.S. Ser. No. 09/830,447), the contents of which are hereby incorporated by reference, how the measurements from a network of LMUs can be collected together into one list, the 'virtual' LMU (VLMU) as if all the BTSs could have been measured by that single VLMU. An extension to this invention is to set up one or more VLMUs in a GSM or other transmission network which has no real LMUs at all. Timing measurements by handsets like those described above, especially in relation to equations (5) to (12), can be processed to provide a map of the receive time offsets of the signals from the BTSs, which may be kept in the VLMUs and used in subsequent standard CURSOR or other E-OTD position calculations. One might also imagine a system in which a sparse coverage of real LMUs is augmented in one or more VLMUs by handset measurements to provide the same level of service as from a full network of real LMUs.

The operation of an exemplary system incorporating the invention will now be described with the aid of simulated measurements.

Figure 6:
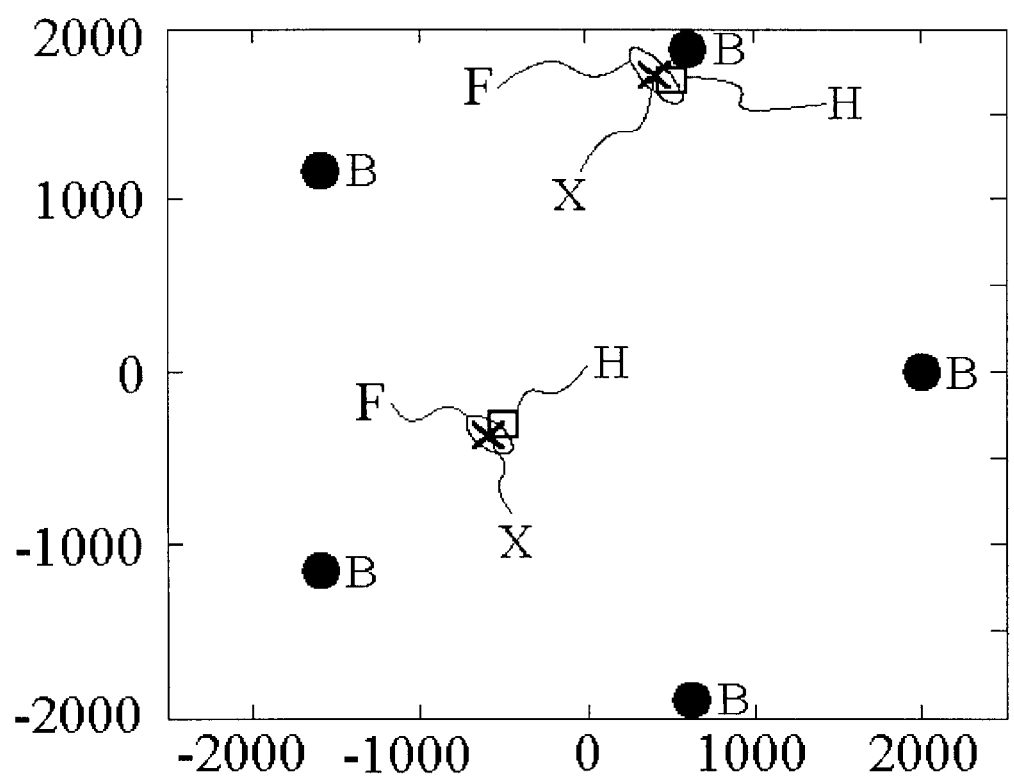
FIG. 6 shows a hypothetical GSM network of BTSs and handsets.

In FIG. 6 is shown a hypothetical network of five BTSs B by the filled circles. Also shown are the positions of two handsets H by the open squares, a distance of about 2.2 km apart. A computer program (which in practice could be running in the microprocessor of one or both of the handsets) was used to generate a list of the timing offset measurements which would have been made by each of the handsets H, including the addition of a random noise element equivalent to 50 metres rms to simulate real conditions more closely. Each BTS B was assigned an arbitrary and different signal timing offset, $\alpha$, selected at random with respect to a universal 'absolute' clock. Each handset H was also assigned a random value for the synchronisation error, $\epsilon$, of its internal clock. The distances from each handset to each BTS were then used to compile a list of the time offsets of the signals received by each handset relative to its internal clock. The two lists of timing offsets were then processed in a computer programmed to solve the five equations (12) above. The results are shown in the figure by the crosses X. The errors in eastings and northings for the handset towards the lower left-hand corner were −95 and −59 metres respectively, and for the handset near the upper right-hand corner the errors were −100 and +30 metres. The ellipses F surrounding the marked positions represent the regions of confidence within which the true position was predicted to lie at the 67 per cent level. The semi-major axes were of length 160 and 240 metres.

It is interesting to note that, in general, there is a significant correlation between the errors in the positions generated by this method, with the result that the distance from one handset to another is known more accurately. In the example above, the error in the measured distance, actually 2.2 km, was less than 90 metres.

A second example of a system according to the invention will now be described in which various rates of change, or derivatives, of the measured quantities are used.

In the first of equations 7 the case was considered of a single handset making measurements of the signals from a BTS, A, of the observed time offset, $\Delta t_{a1}(t_1)$, when at position $r(t_1)$ at time $t_1$, and of the observed time offset, $\Delta t_{a1}(t_2)$, when at position $r(t_2)$ at time $t_2$. This equation is reproduced here:

$$\Delta t_{a1}(t_1)-\Delta t_{a1}(t_2)=(|r(t_1)-a|-|r(t_2)-a|)/v+(\alpha_a(t_1)-\alpha_a(t_2))+(\epsilon_1(t_1)-\epsilon_1(t_2)).$$

In what follows, it is helpful to adopt the following changes to our nomenclature:

---

$t_1$ becomes $t$
$t_2$ becomes $t + \Delta t$
$\Delta t_{a1}(t)$ becomes $T_a(t)$
$T(t + \Delta t) - T(t)$ becomes $\Delta T_a(t)$
$\epsilon_1$ becomes $\epsilon$.

---

The equation then becomes $$\Delta T_a(t)=(|r(t+\Delta t)-a|-|r(t)-a|)/v+\alpha_a(t+\Delta t)-\alpha_a(t)+\epsilon(t+\Delta t)-\epsilon(t). \quad (13)$$

The assumption is made once again that the stability of the BTS transmissions in the network is such that the values of α do not change significantly over the period of the measurements, Δt, (which can be made arbitrarily short). Thus $\alpha_a(t+\Delta t)=\alpha_a(t)$, and equation 13 can be simplified. The complete set for five BTSs then becomes $$\Delta T_a(t)=(|r(t+\Delta t)-a|-|r(t)-a|)/\upsilon+\epsilon(t+\Delta t)-\epsilon(t)$$

$$\Delta T_b(t)=(|r(t+\Delta t)-b|-|r(t)-b|)/\upsilon+\epsilon(t+\Delta t)-\epsilon(t)$$

$$\Delta T_c(t)=(|r(t+\Delta t)-c|-|r(t)-c|)/\upsilon+\epsilon(t+\Delta t)-\epsilon(t)$$

$$\Delta T_d(t)=(|r(t+\Delta t)-d|-|r(t)-d|)/\upsilon+\epsilon(t+\Delta t)$$

$$\Delta T_e(t)=(|r(t+\Delta t)-e|-|r(t)-e|)/\upsilon+\epsilon(t+\Delta t). \quad (14)$$

Figure 3:
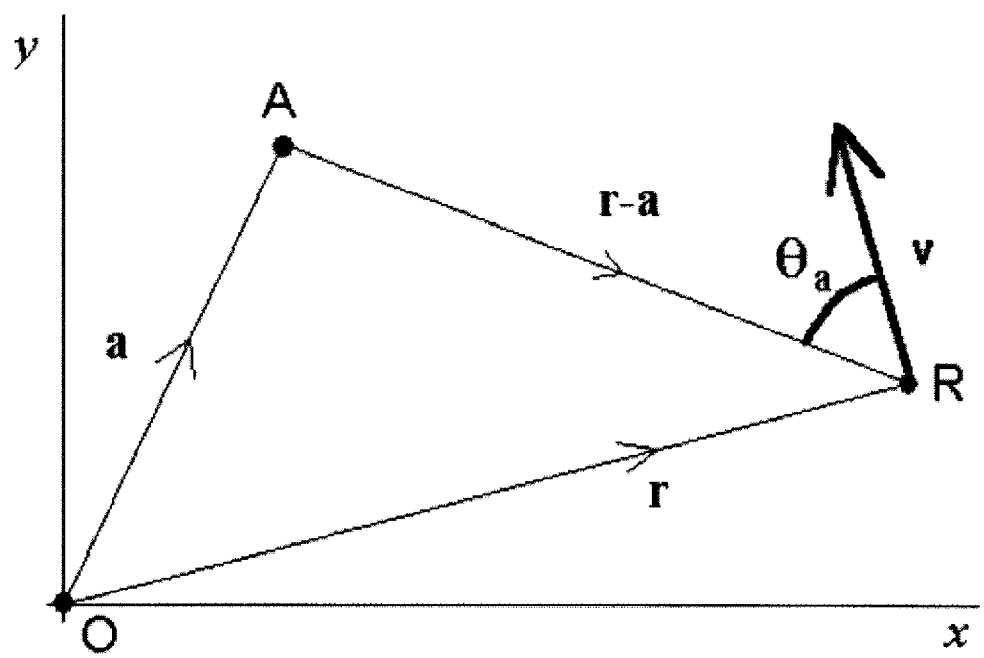
FIG. 3 illustrates further the geometry of a standard two-dimensional system.

These equations can be solved in precisely the same manner as equations 12 to give both $r(t+\Delta t)$ and $r(t)$ without reference to an LMU network. As Δt is allowed to tend to zero, so rates of change, or derivatives, of the quantities are found as follows:

$$\frac{dT_a}{dt} = |v|\cos\theta_a/\upsilon + \frac{d\varepsilon}{dt} \quad (15)$$

$$\frac{dT_b}{dt} = |v|\cos\theta_b/\upsilon + \frac{d\varepsilon}{dt}$$

$$\frac{dT_c}{dt} = |v|\cos\theta_c/\upsilon + \frac{d\varepsilon}{dt}$$

$$\frac{dT_d}{dt} = |v|\cos\theta_d/\upsilon + \frac{d\varepsilon}{dt}$$

$$\frac{dT_e}{dt} = |v|\cos\theta_e/\upsilon + \frac{d\varepsilon}{dt},$$

where v is the velocity of the handset (v=dr/dt), θ is the angle between the velocity vector and the vector from the BTS to the handset (see FIG. 3), and dε/dt is the rate of change of the handset's internal clock, i.e. the frequency offset of the handset's crystal oscillator from its nominal value. These equations are mathematically the same as equations 14 and can be solved to give both the handset's position, r, and velocity, v, without reference to an LMU network.

If it is also assumed that the handset is travelling at a constant velocity, then further derivatives can be evaluated as follows:

$$\upsilon\frac{d^2T_a}{dt^2} = \frac{|v|^2}{|r-a|}\sin^2\theta_a, \quad (16)$$

$$\upsilon\frac{d^3T_a}{dt^3} = -3\frac{|v|^3}{|r-a|^2}\cos\theta_a\sin^2\theta_a,$$

in which the assumption has been made that the value of $d^2\epsilon/dt^2$ is negligible.

In many circumstances, measurements of only some of these parameters might be available. Nevertheless, they can be included with other E-OTD calculations to improve the estimates of the handset's position. However, if measurements are made of all of these parameters then both the distance between the BTS and the handset, and the handset's velocity, can be determined as functions of dε/dt as follows $$|r-a| = \left(3\cdot\upsilon\frac{dT_a}{dt}\frac{d^2T_a}{dt^2}\bigg/\frac{d^3T_a}{dt^3}\right) - \left(3\cdot\upsilon\frac{d^2T_a}{dt^2}\bigg/\frac{d^3T_a}{dt^3}\right)\frac{d\varepsilon}{dt} \quad (17)$$

$$|v|\cos\theta_a = \frac{dT_a}{dt} - \frac{d\varepsilon}{dt}$$

$$|v|\sin\theta_a = \frac{d^2T_a}{dt^2}\sqrt{\frac{3\left(\frac{d\varepsilon}{dt}-\frac{dT_a}{dt}\right)}{\frac{d^3T_a}{dt^3}}}$$

If measurements are made on three or more geographically disparate BTSs, then one can solve directly for r, dε/dt and v without any reference to an LMU network.

There are circumstances, however, when the equations cannot be evaluated. These occur when $d^3T_a/dT^3$ is zero. Even in these cases information about r and v can still be obtained as there are only four possible reasons for this zero value (in the absence of noise):

1. If the handset is stationary, ie. v=0, then both $d^2T_a/dT^2$ and $d^3T_a/dt^3$ are zero, so $$\frac{dT_a}{dt} = \frac{d\varepsilon}{dt}.$$

2. If $\theta_a=\pm 90°$ then $d^3T_a/dt^3$ will be zero and hence $$\frac{d^2T_a}{dt^2} = \frac{|v|^2}{|r-a|\cdot\upsilon}, \quad \text{and} \quad \frac{dT_a}{dt} = \frac{d\varepsilon}{dt}.$$

3. If the handset is travelling directly towards the BTS, i.e. $\theta_a=0°$, then $d^2T_a/dT^2$ and $d^3T_a/dt^3$ will both be zero, whilst $$\frac{dT_a}{dt} = \frac{|v|}{\upsilon} + \frac{d\varepsilon}{dt}.$$

4. If the handset is travelling directly away from the BTS, i.e. $\theta_a=180°$, then both $d^2T_a/dT^2$ and $d^3T_a/dt^3$ will be zero, whilst $$\frac{dT_a}{dt} = \frac{-|v|}{\upsilon} + \frac{d\varepsilon}{dt}.$$

If the handset passes directly underneath the BTS while making measurements, i.e. r=a, then there is a discontinuity in $$\frac{dT_a}{dt}.$$

If such a discontinuity is observed by a handset then its position is immediately known through a measurement from just the single BTS.

When handsets are used in a digital telephone network, such as a GSM system, the handset timing is made to advance with respect to the signals received from the 'serving BTS' (ie the BTS with which the handset is in communication for telephonic purposes), so as to cause the handset signals to be received by the serving BTS in synchronism with its own signals. This is often known as 'timing advance'. In practice, this means that the handset synchronises its own internal clocks to the signals received from the serving BTS, say BTS A. This synchronisation alters equations 16 to have the following forms:

$$v\frac{dT_{ba}}{dt} = |v|(\cos\theta_b - \cos\theta_a)$$

$$v\frac{d^2 T_{ba}}{dt^2} = |v|^2\left(\frac{\sin^2\theta_b}{|r-b|} - \frac{\sin^2\theta_a}{|r-a|}\right)$$

$$v\frac{d^3 T_{ba}}{dt^3} = -3|v|^3\left(\frac{\cos\theta_b \sin^2\theta_b}{|r-b|^2} - \frac{\cos\theta_a \sin^2\theta_a}{|r-a|^2}\right)$$

(18)

Measurements of some or all of these values also can be combined with the other E-OTD measurements to give additional constraints and hence better accuracy of the predicted position and velocity. For example, if all of the above parameters are measured for both BTSs B and C, then as before the equations can be solved without reference to an LMU network to give the position and velocity of the handset.

In the foregoing example of a system of the invention, measurements of timing offsets have been used, for example to estimate the rate of change of a timing offset. This is equivalent to measuring the frequency offset of the signals from that BTS, and this may be achieved directly by measuring and analysing the base-band signals from the receiver. For example, the digitised I and Q data samples corresponding to, say, a synchronisation burst in a GSM system (whose form is known in advance) could be transformed into the frequency domain using a well-known technique such as a fast Fourier transform, and the frequency of identified features compared with expected values to obtain the frequency offset of the signals.

This technique has been simulated in a computer program to test the effect of the signal to noise ratio on the accuracy with which the speed of the handset can be measured by this method. The accuracy depends also on the number of samples, N, in the template used to match the fequency spectrum. The results are as follows:

| S/N ratio | N = 64 | N = 128 | N = 256 |
|---|---|---|---|
| 10 | 38.4 | 12.8 | 4.8 |
| 30 | 12.8 | 4.3 | 1.6 |
| 100 | 3.8 | 1.3 | 0.5 |

This table gives the error in kilometres per hour associated with corresponding values of S/N ratio and template length.

What is claimed is:

1. A method of determining the positions of receivers, the positions of which are not already known, in a network of transmission sources some or all of the positions of which ate known, the method comprising:
    (a) at a first time, measuring a first set of offsets in time or phase between signals received by a first receiver, the position of which is not already known, from a plurality of the transmission sources and a signal received by said first receiver from another of said transmission sources or a reference source;
    (b) at a selected second time, measuring a second set of offsets in time or phase between signals received by a second receiver, the position of which is not already known, from the plurality of the transmission sources and a signal received by said second receiver from another of said transmission sources or a reference source; and
    (c) calculating the positions of the first and second receivers from the relationship between the first and second sets of offsets.

2. A method according to claim 1, wherein the first and second times are the same.

3. A method according to claim 1 or claim 2, wherein at selected additional times, the respective offsets in time or phase with respect to a signal received from another transmitter or a reference source of the signals received by the first receiver, or by the second receiver, or another receiver or receivers the position or positions of which is or are not already known, from a plurality of the transmission sources is measured; and the position of any or all of the receivers is determined using said measurements and known positions of the transmission sources.

4. A method according to claim 3, wherein any of the selected times is the same as any other of the selected times.

5. A method according to claim 1 or claim 2, wherein said receivers are handsets of a GSM system and wherein the or each handset has its timing advanced to be in synchronism with a serving BTS.

6. A method according to claim 5, which further includes:
    (d) measuring, at a first time, the offsets in time or phase with respect to a signal received from another transmitter or a reference source, of the signals received by a first handset from a non-serving BTS;
    (e) measuring, at a selected second time, the relative offsets in time or phase, respectively with respect to a signal received from another transmitter or a reference source of the signals received by a second handset from the non-serving BTS;
    (f) calculating the positions of the first and second handsets from the relationship between the first and second sets of offsets.

7. A system for determining the positions of receivers, the positions of which are not already known, in a network of transmission sources some or all of the positions of which are known, the system comprising:
    (a) means for measuring, at a first time, a first set of offsets in time or phase between signals received by a first receiver, the position of which is not already known, from a plurality of the transmission sources and a signal received by said first receiver from another of the transmission sources or a reference source;
    (b) means for measuring, at a selected second time, a second set of offsets in time or phase between signals received by a second receiver, the position of which is not already known, from the plurality of the transmission sources and a signal received by said second receiver from another of said transmission sources or a reference source;
    (c) means for calculating the positions of the first and second receivers from the relationship between the first and second sets of offsets.

8. A system according to claim 7, further comprising:
    (d) means for measuring, at selected additional times, the respective offsets in time or phase, with respect to a signal received from another transmitter or a reference source, of the signals received by the first receiver, or by the second receiver, or another receiver or receivers the position or positions of which is or are not already known, from a plurality of the transmission sources; and
    (e) means for calculating the position of any or all of the receivers using said measurements and known positions of the transmission sources.

9. A system according to claim 7 or 8, wherein said measuring means and said calculating means include a microprocessor in one or more of said receivers.

10. A system according to claim 7 or 8, which comprises a component or components of a GSM system.

11. A system according to claim 10, which includes one or more handsets, the or each of which has its timing advanced to be in synchronism with a serving BTS.

12. A system according to claim 11, which further includes (f) means for measuring, at a first time, the offsets in time or phase, with respect to a signal received from another transmitter or a reference source, of the signals received by a first handset from a non-serving BTS;

(g) means for measuring, at a selected second time, the relative offsets in time or phase, respectively with respect to a signal received from another transmitter or a reference source of the signals received by a second handset from the non-serving BTS;

(h) means for calculating the positions of the first and second handsets from the relationship between the first and second sets of offsets.

\* \* \* \* \*